(12) United States Patent
Hawkins et al.

(10) Patent No.: US 12,361,303 B2
(45) Date of Patent: *Jul. 15, 2025

(54) DISPLACEMENT PROCESSOR FOR INFERENCING AND LEARNING BASED ON SENSORIMOTOR INPUT DATA

(71) Applicant: Numenta, Inc., Redwood City, CA (US)

(72) Inventors: Jeffrey Charles Hawkins, Atherton, CA (US); Marcus Anthony Lewis, San Francisco, CA (US)

(73) Assignee: Numenta, Inc., Redwood City, CA (US)

( * ) Notice: Subject to any disclaimer, the term of this patent is extended or adjusted under 35 U.S.C. 154(b) by 153 days.

This patent is subject to a terminal disclaimer.

(21) Appl. No.: 18/308,333

(22) Filed: Apr. 27, 2023

(65) Prior Publication Data

US 2023/0259797 A1 Aug. 17, 2023

Related U.S. Application Data

(63) Continuation-in-part of application No. 17/198,808, filed on Mar. 11, 2021, now Pat. No. 12,093,843, and
(Continued)

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC ............ G06N 5/04; G06N 5/02; G06N 20/00; G06N 3/08; G06V 10/40; G06V 10/54;
(Continued)

(56) References Cited

U.S. PATENT DOCUMENTS 8,160,309 B1 4/2012 Tzur et al.
8,626,686 B1 1/2014 Rhodes
(Continued)

FOREIGN PATENT DOCUMENTS

CN 1496549 A 5/2004
CN 101107618 A 1/2008
(Continued)

OTHER PUBLICATIONS

PCT International Search Report and Written Opinion, PCT Application No. PCT/US18/24148, Jun. 6, 2018, 19 pages.
(Continued)

*Primary Examiner* — Oneal R Mistry
*Assistant Examiner* — Duy Tran
(74) *Attorney, Agent, or Firm* — WTA Patents

(57) ABSTRACT

Described herein are apparatus and methods for performing inference into the identity of an object. For an object of a plurality of objects, the apparatus receives feature-location information identifying a feature at first location on a first object of the plurality and a feature at a second location on a second object of the plurality. The apparatus activates a first set of location cells that collectively represent the first location on the first object corresponding to a feature on an object of the plurality of objects and a second set of location cells that collectively represent the second location on the second object corresponding to a feature on an object of the plurality of objects. The apparatus activates a set of displacement cells representing displacement of the first set of location cells and the second set of location cells and identifies one or more objects by processing the displacement cells.

20 Claims, 11 Drawing Sheets

Related U.S. Application Data a continuation of application No. 16/849,726, filed on Apr. 15, 2020, now abandoned, said application No. 17/198,808 is a continuation of application No. 15/594,077, filed on May 12, 2017, now Pat. No. 10,977,566.

(60) Provisional application No. 62/835,329, filed on Apr. 17, 2019, provisional application No. 62/335,995, filed on May 13, 2016.

(58) Field of Classification Search
CPC .... G06V 30/18; G06V 10/44; G06V 30/1801; G06V 30/182; G06V 30/1823; G06V 30/1826; G06V 30/1829; G06V 30/1831; G06V 30/1834; G06V 30/1837; G06V 10/28; G06V 30/162; G06K 9/00
See application file for complete search history.

(56) References Cited

U.S. PATENT DOCUMENTS

| | | | |
|---|---|---|---|
| 8,645,291 B2 | 2/2014 | Hawkins et al. | |
| 9,015,093 B1 | 4/2015 | Commons | |
| 9,098,741 B1 | 8/2015 | Anguelov et al. | |
| 9,102,055 B1 | 8/2015 | Konolige et al. | |
| 9,189,745 B2 | 11/2015 | Hawkins et al. | |
| 2004/0193789 A1 | 9/2004 | Rudolf | |
| 2005/0021334 A1 | 1/2005 | Iwahashi | |
| 2005/0065650 A1 | 3/2005 | Lewis | |
| 2007/0003130 A1* | 1/2007 | Goerick | G06V 20/10 382/153 |
| 2011/0085702 A1 | 4/2011 | Nevatia | |
| 2014/0333775 A1 | 11/2014 | Naikal et al. | |
| 2015/0036935 A1 | 2/2015 | Iio et al. | |
| 2015/0117760 A1* | 4/2015 | Wang | G06N 3/08 382/157 |
| 2015/0178931 A1* | 6/2015 | Gao | G06T 11/60 382/103 |
| 2015/0269484 A1 | 9/2015 | Hawkins et al. | |
| 2015/0294192 A1 | 10/2015 | Lan | |
| 2015/0324655 A1 | 11/2015 | Chalasani | |
| 2016/0055409 A1 | 2/2016 | Majumdar et al. | |
| 2016/0082597 A1* | 3/2016 | Gorshechnikov | G06V 10/462 901/1 |
| 2016/0092736 A1* | 3/2016 | Mai | G06V 40/10 382/103 |
| 2016/0096270 A1* | 4/2016 | Ibarz Gabardos | B25J 9/0081 901/3 |
| 2016/0217164 A1 | 7/2016 | Hawkins et al. | |
| 2017/0330091 A1 | 11/2017 | Hawkins et al. | |
| 2018/0276464 A1 | 9/2018 | Hawkins et al. | |
| 2019/0381670 A1 | 12/2019 | Correll et al. | |

FOREIGN PATENT DOCUMENTS

| | | |
|---|---|---|
| CN | 102609088 A | 7/2012 |
| CN | 103838423 A | 6/2014 |
| CN | 103890695 A | 6/2014 |
| CN | 104103189 A | 10/2014 |
| CN | 104977038 A | 10/2015 |
| WO | WO 2007/119186 A2 | 10/2007 |
| WO | WO 2013/019743 A2 | 2/2013 |
| WO | WO 2017/197298 A1 | 11/2017 |

OTHER PUBLICATIONS

United States Office Action, U.S. Appl. No. 15/934,795, filed Dec. 30, 2019, 17 pages.
Sung J, Jin SH, Lenz I, Saxena A Robobarista: Learning to manipulate novel objects via deep multimodal embedding. arXiv preprint arXiv: 1601.02705. Jan. 12, 2016. (Year: 2016).
Song D, EK CH, Huebner K, Kragic D. Task-based robot grasp planning using probabilistic inference. IEEE transactions on robotics. Apr. 2, 2015; 31(3):546-61. (Year: 2015).
Hild, M. et al., "Grasping Guidance for Visually Impaired Persons based on Computed Visual-auditory Feedback," 2014 International Conference on Computer Vision Theory and Applications, Oct. 12, 2015, pp. 75-82.
China National Intellectual Property Administration, Office Action, CN Patent Application No. 201780028950.7, Oct. 18, 2021, 16 pages.
OA of U.S. Appl. No. 17/990,183 mailed on Aug. 15, 2023.
Gesrstner et al. Spiking Neuron Models, 2002, pp. 1-20, Cambridge University Press.
Mai et al. Simple Perception-Action Strategy Based on Hierarchical Temporal Memory, Dec. 2013, Shenzen, China, International Conference on Robotics and Biomimetics pp. 1759-1764.
Ashby et al. A Neurobiological theory of Automaticity in Perceptual Categorization, Psychological Review 2007, vol. 114, No. 3, pp. 632-656.
Huttenlocher, D. et al., "Recognizing solid objects by alignment with an image," International Journal of Computer Vision, 1990, vol. 5, No. 2, pp. 195-212.
The German Patent and Trademark Office, Office Action, DE Patent Application No. 11 2017 002 468.4, Sep. 23, 2021, 18 pages.
Bosking, W.H. et al., "Orientation Selectivity and the Arrangement of Horizontal Connections in Tree Shrew Striate Cortex," The Journal of Neuroscience, Mar. 15, 1997, pp. 2112-2127, vol. 17.
Gur, M. et al., "Physiological Differences Between Neurons in Layer 2 and Layer 3 of Primary Visual Cortex (V1) of Alert Macaque Monkeys," J. Physiol., 2008, pp. 2293-2306, vol. 586, No. 9.
Hawkins, J. et al., "3D Object Learning with Cortical Columns," Computational and Systems Neuroscience (Cosyne) 2017, Feb. 24, 2017, one page.
Hawkins, J. et al., "Why Neurons Have Thousands of Synapses, a Theory of Sequence Memory in Neocortex," Frontiers in Neural Circuits, Mar. 2016, pp. 1-13, vol. 10, Article 23.
PCT International Preliminary Report on Patentability, PCT Application No. PCT/US2017/032464, Nov. 13, 2018, ten pages.
PCT International Search Report and Written Opinion, PCT Application No. PCT/US17/32464, dated Jul. 26, 2017, 19 pages.
PCT International Search Report and Written Opinion, PCT Application No. PCT/US20/14670, dated Apr. 23, 2020, 13 pages.
Thomson, A.M. et al., "Interlaminar Connections in the Neocortex," Cerebral Cortex, 2003, pp. 5-14, vol. 13, Issue 1.
Von Der Heydt, R., "Figure—Ground Organization and the Emergence of Proto-Objects in the Visual Cortex," Frontiers in Psychology, Nov. 3, 2015, pp. 1-10, vol. 6, Article 1695.
Collet, A. et al., "Object Recognition and Full Pose Registration from a Single Image for Robotic Manipulation," 2009, 8 pages.
Gordon, I. et al.; What and Where: 3D Object Recognition with Accurate Pose; s first presented at the International Symposium on Mixed and Augmented Reality, 2004 [8]; pp. 1-16.
Hawkins, J. et al., "A Framework for Intelligence and Cortical Function Based on Grid Cells in the Neocortex," Oct. 13, 2018, pp. 1-15.
Soria, Pablo Ramon et al.; "Detection, Location and Grasping Objects Using a Stereo Sensor on UAV in Outdoor Environments," Sensors 2017, 17, 103; doi:10.3390/s17010103; pp. 1-16.
United States Office Action, U.S. Appl. No. 15/594,077, filed Jun. 10, 2020, eight pages.

* cited by examiner

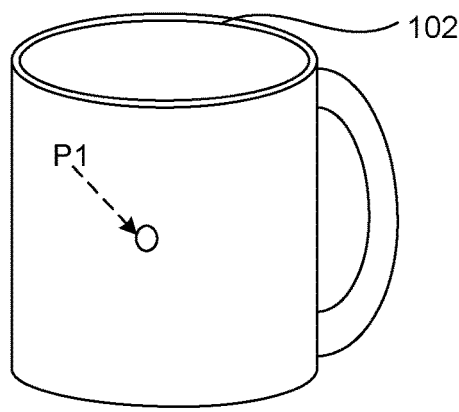
FIG. 1A  FIG. 1B
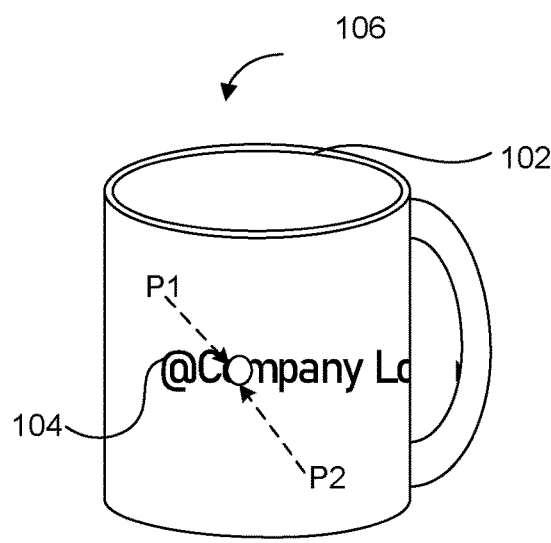
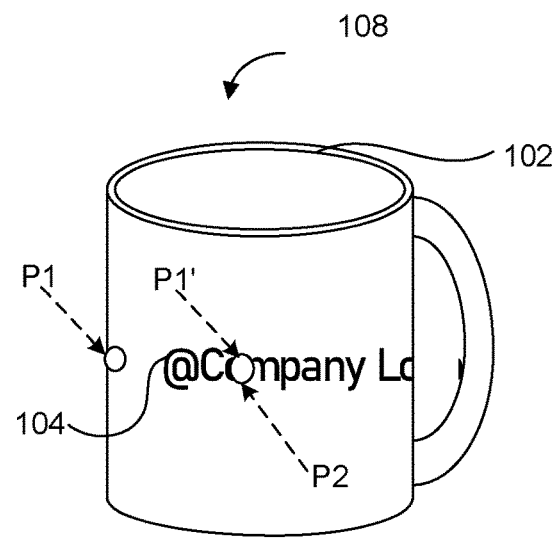
FIG. 1C  FIG. 1D

DISPLACEMENT PROCESSOR FOR INFERENCING AND LEARNING BASED ON SENSORIMOTOR INPUT DATA

CROSS REFERENCE TO RELATED APPLICATIONS

This application is continuation of U.S. patent application Ser. No. 16/849,726, filed on Apr. 15, 2020, which claims priority to U.S. Provisional Application No. 62/835,239, filed on Apr. 17, 2019; and is a continuation-in-part of U.S. patent application Ser. No. 17/198,808, filed on Mar. 11, 2021, which claims priority to U.S. patent application Ser. No. 15/594,077, filed on May 12, 2017, which claims the benefit of U.S. Provisional Application No. 62/335,995, filed on May 13, 2016, which are incorporated by reference in their entirety.

BACKGROUND

1. Field of the Disclosure

The present disclosure relates to performing inference on received input data, and specifically relates to performing inference based on sensorimotor input data.

2. Description of the Related Arts

Object detection systems aim to find or recognize different types of objects present in input data. The input data for object detection may be in the form of image data, video data, tactile data, or other types of sensor data. For example, an object detection system may recognize different objects, such as a coffee cup, a door, and the like, included in visual images that are captured by a camera or sensed by tactile sensors.

Conventional object detection systems face many challenges. One of such challenges is that the same object may be placed in different locations and/or orientations. The change in the locations and/or orientations of the objects from the originally learned locations and/or orientation may cause the conventional object detection systems to recognize the same object as different objects. Such problem may be more acute when tactile sensors on, for example, a robotic hand are used to recognize an object. Existing object detection models, such as convolutional neural network models (CNN), are not always sufficient to address the changes in the location and/or locations, and often require significant amounts of training data even if they do address such changes.

Moreover, regardless of the types of sensors, the input data including a representation of an object has spatial features that would distinguish from a representation of another object. The absence of spatially distinctive features may give rise to ambiguity as to the object being recognized. Conventional object detection systems do not adequately address such ambiguity in the objects being recognized.

SUMMARY

Embodiments relate to performing inference using a location processor receiving feature information data identifying a plurality of features associated with locations on objects. The locations include a location of a first feature on a first object and a location of a second feature on a second object. The location processor activates a first set of location cells that collectively represent the first location on the first object which corresponds to at least a first subset of the plurality of features. The location processor activates a second set of location cells that collectively represent the second location on the second object which corresponds to at least a second subset of the plurality of features. In response to receiving the activation states of the first set of location cells followed by the activation states of the second set of location cells, a displacement processor activates a set of displacement cells representing a displacement of the second set of location cells relative to the first set of location cells. By processing the set of displacement cells, an application processor identifies one or more objects associated with the first subset of features and the second set of features.

BRIEF DESCRIPTION OF THE DRAWINGS

The teachings of the embodiments can be readily understood by considering the following detailed description in conjunction with the accompanying drawings.

FIG. 1A is a conceptual diagram illustrating a first object associated with a plurality of features, according to one embodiment.

FIG. 1B is a conceptual diagram illustrating a second object with a plurality of features, according to one embodiment.

FIG. 1C is a conceptual diagram illustrating a combined object represented by two objects positioned relative to each other, according to one embodiment.

FIG. 1D is a conceptual diagram illustrating a combined object represented by two objects with coordinate locations at two distinct physical locations, according to an embodiment.

DETAILED DESCRIPTION OF EMBODIMENTS

Figure 2:
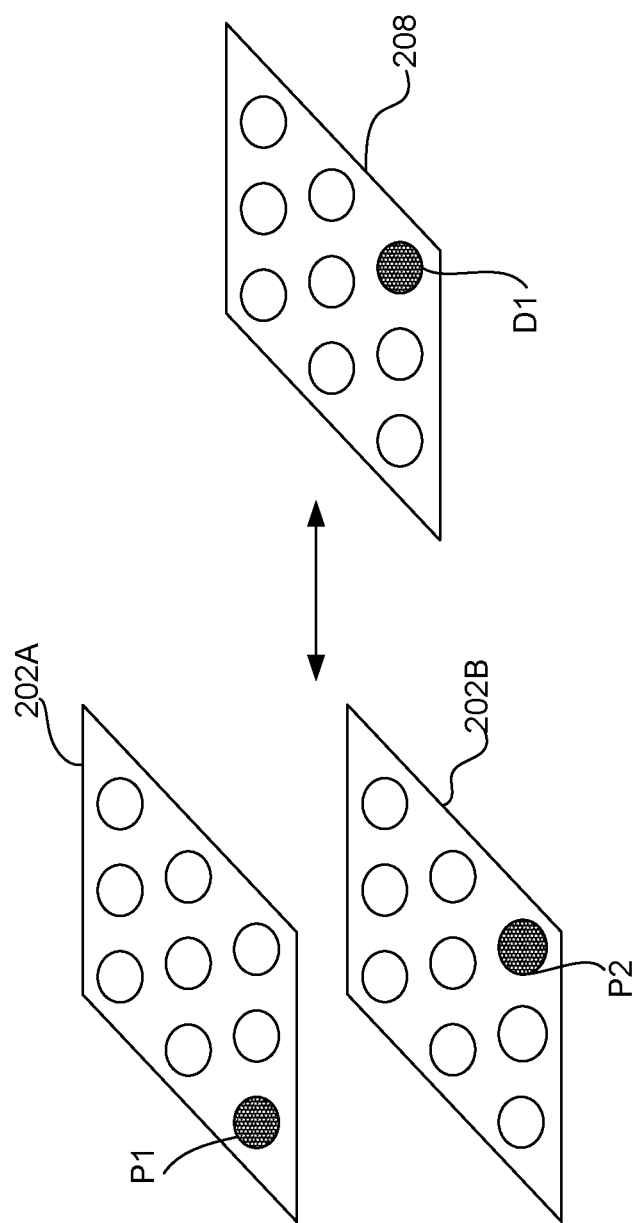
FIG. 2 is a conceptual diagram illustrating two sets of activated location cells and the resulting activated displacement cells, according to one embodiment.

In the following description of embodiments, numerous specific details are set forth in order to provide more thorough understanding. However, note that the present invention may be practiced without one or more of these specific details. In other instances, well-known features have not been described in detail to avoid unnecessarily complicating the description.

A preferred embodiment is now described with reference to the figures where like reference numbers indicate identical or functionally similar elements. Also in the figures, the left most digits of each reference number correspond to the figure in which the reference number is first used.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The language used in the specification has been principally selected for readability and instructional purposes, and may not have been selected to delineate or circumscribe the inventive subject matter. Accordingly, the disclosure set forth herein is intended to be illustrative, but not limiting, of the scope, which is set forth in the claims.

Embodiments relate to performing inference using displacement information that indicates the displacement between two or more features of objects. The displacement is represented by activation of cells in a displacement processor. The displacement processor receives object-location information from a location processor. The location information may indicate object-centric locations on a particular object. Embodiments of the system described herein may perform inference on a new object by combining features of two or more learned objects using displacement information determined between the features.

As described herein, a feature of an object refers to properties associated with a location of the object. The same feature may be shared across multiple objects or multiple locations on the same object. The feature may include, but is not limited to, a 3-D geometry of a shape or amount of traffic flow at a node.

As described herein, a location refers to a position or site of an object that are associated with certain features. The location may be physical (e.g., spatial), logical (location within a logical hierarchical structure) or a combination of both. The location may be encoded in various scheme including but not limited to sparse distributed representation.

As described herein, feature-location information includes an identification of a feature on an object and a location of the feature on the object. Different objects may be defined by a set of different pairs of features and locations that appear on the object. Different objects can be defined by a combination of features and locations that appear on the object. Accordingly, by identifying combinations of different pairs of features and locations as they appear during inference, different objects can be recognized.

As described herein, object-location information represents the location of an object in a coordinate system. In embodiments in which the locations of objects are described relative to each other, a displacement is measured between the objects.

As described herein, a displacement refers to a relative difference between two locations or object-locations. Displacement may be measured between locations on different objects in the same coordinate system or in different coordinate systems. The displacement may be physical (e.g., spatial), logical (locations within a logical hierarchical structure) or a combination of both.

Example of Representing New Object as Combination of Objects

FIG. 1A is a conceptual diagram illustrating a first object which may be associated with a plurality of features, according to one embodiment. In particular, FIG. 1A illustrates a cup 102 which is associated with a plurality of features, for example a hollowed, cylinder with a bottom surface or a handle attached to the cylinder. The cup 102 is associated with its own unique set of locations in an object-centric coordinate system (e.g., a coordinate system centered around the cup). One such unique location P1 represents a center location of a cylindrical body of the cup 102. The location P1 associated with the cylindrical body is described in an allocentric context, that is a coordinate system relative to the cup 102. Similarly, FIG. 1B illustrates a second object which is associated with a plurality of features, according to one embodiment. In particular, FIG. 1B is a conceptual diagram illustrating a logo 104 that is associated with feature including "@" text and "Company Logo" text. Just as cup 102 is associated with a unique set of locations, the logo 104 is associated with its own unique set of locations in a different object-centric coordinate system (e.g., a coordinate system centered around the logo). One such location, P2, represents a particular location on the logo 104 above alphabet character "o".

Assuming that the features and locations associated with both the cup 102 and the logo 104 are previously learned and indexed, a new object (e.g., a cup with a company logo), which is the combination of these two previously learned objects (e.g., the cup 2 and the logo 104), may be represented and indexed by the relative locations between the features of the two objects in the different coordinate systems (e.g., the center of the cylindrical body of the cup 102 at P1, and the alphabet character "o" of the logo 103 at location P2). FIG. 1C illustrates such a new composite object 106 represented by two objects positioned relative to each other, according to one embodiment. In particular, the new combined object 106 "a cup with a company logo" is represented by a relative location between the location P1 on the first object (i.e., the cup 102) and the location P2 on the second object (i.e., the logo 104). When a sensor is in contact with the "cup with a company logo" 106, the location of the contact represents both a location of the contact in the coordinate system of the cup 102 and the location of the contact in the coordinate system of the logo 104. When the logo 104 is combined with the cup 104 to represent the composite object 106, for example as illustrated in FIG. 1C, there exists a one-to-one relationship between any point in the coordinate system of the logo 104 and a corresponding point in the coordinate system of cup 102. Accordingly, the composite object 106 may be represented based on the displacement that converts a point in the coordinate system of the cup 102, for example P1, to a corresponding point in the coordinate system of the logo 104, for example P2. Because P1 and P2 represent the same physical location in two different coordinate systems (the coordinate system centered around the cup 102 and the coordinate system centered around the logo 104), P1 and P2 represent the same location on the composite object 106.

Using the displacement between locations P1, P2 of certain features in the two objects (e.g., the cup 102 and the logo 104) and, accordingly between two different coordinate systems, in combination with the locations of features on each of the two objects, a new object can be represented and indexed. One example of such representation is assigning one or more displacement cells among a plurality of displacement cells to indicate the displacement between the locations P1, P2 of features in the two objects. To further characterize displacement between locations in different coordinate systems, consider the cup with the logo 106 in an environment. A sensor at a first location may detect the location P1 on the cup, while detecting the location P2 on the logo from a second location. Accordingly, the sensor may be positioned at two different locations in the environment while still being able to detect the combined object. Accordingly, the displacement between such the first location of the sensor and the second location of the sensor characterizes features of the cup 102, features of logo 104, and the relative locations of these features (e.g., P1 and P2).

As described above, a combination of activated displacement cells represents a displacement a physical location in first coordinate system and the same physical location in a second coordinate system, which enables the representation of a composite object. However, in more complex embodiments, in addition to representing locations in different object-centric coordinate systems, P1 and P2 may also represent two distinct physical locations. FIG. 1D is a conceptual diagram illustrating a combined object represented by two objects with coordinate locations at two distinct physical locations, according to an embodiment. In FIG. 1D, P1 and P2 represent two distinct physical locations, according to an embodiment. As illustrated in FIG. 1D, P1 represents a coordinate location in a first object-centric coordinate system (e.g., a coordinate system centered around the cup 102) that corresponds to a first physical location. P2 represents a coordinate location in a second object-centric coordinate system (e.g., a coordinate system centered around the logo 104) that corresponds to a second physical location. Accordingly, when a sensor moves from the first physical location at P1 to the second physical location at P2, an inference system applies techniques to predict a coordinate location in the first object-centric coordinate system that corresponds to the second physical location. The predicted coordinate location may be referred to as P1'. In an alternate implementation (not shown), the inference system may predict a coordinate location in the second object-centric coordinate system that corresponds to the first physical location, for example a P2'. Accordingly, as illustrated in FIG. 1D, the displacement between P1 and P2 is represented as the displacement between P1' and P2, because P1' is a representation of P1 at the second physical location in the coordinate system of the cup 102.

To predict or compute a new coordinate location that represents a new physical location in a coordinate system, an inference system may implement a combination of techniques (e.g., path integration, dead reckoning) that rely on movement information between physical locations, a spatial signal, a visual cue indicating the new physical location, an alternate form of information, or a combination thereof. Example techniques for predicting or computing the new coordinate location can be found, for example, in U.S. Patent Application Publication No. 2018/0276464 entitled "Location Processor for Inferencing and Learning Based on Sensorimotor Input Data" published on Sep. 27, 2018, which is incorporated by reference herein in their entirety.

FIG. 2 is a conceptual diagram illustrating two sets of activated location cells and the resulting activated displacement cells, according to one embodiment. In particular, FIG. 2 illustrates the same grid 202A, 202B of location cells and a corresponding grid 208 of displacement cells. Grid 202A indicates when attention is given to the cup 102, specifically, the center of the cup 102. As a result of directing the attention to the feature of the cup 102, a cell (represented by a dark circle) in grid 202A is activated. Grid 202B indicates when attention is given to the logo 104, specifically, the portion of the logo where alphabet character "o" is located (at P2). As a result of directing the attention to the feature of the logo 104, a cell (represented by a dark circle) in grid 202B is activated. Activation of each of the displacement cells in the grid 208 represents occurrence of a predetermined displacement between activated location cells when the attention is shifted. For example, the displacement cell D1 (represented by a dark circle) in the grid 208 is activated when the attention is shifted from the feature of the cup 102 to the feature of the logo 104.

Returning to the embodiment illustrated in FIG. 1C, although, locations P1 and P2 exist in different object-centric coordinate systems (i.e., a first coordinate system centered around the cup and a second coordinate system centered around the logo), the locations P1 and P2 are fixed within their respective coordinate systems. As a result, the displacement between location representations will be the same for any point on the cup. The displacement between two points P1 and P2 encodes the cup 102, the logo 104, and their relative locations on the cup with logo 106. Accordingly, the displacement has a spatial component determined by the placement of the logo 104 on the cup 102 and a random component determined by the random placement of the cup 102 and the logo 104 in a memory space. In the context of FIG. 1D, the coordinate locations P1' and P2 are fixed within their respective coordinate systems relative to a common physical location. As a result, the displacement between two points P1' and P2 would also encode the cup 102, the logo 104, and their relative locations on the composite object "cup with logo" 108. The random component of displacement may be represented as a space within which objects, for example the cup 102 and the logo 104, are randomly placed. Alternatively, the memory space may be represented using a combination of activated grid cells. For example, activating a grid cell in each module may represent an activated random point in a space with more than three dimensions.

Accordingly, given the displacement determined between P1 and P2, or alternatively P1' and P2, the displacement between any point in the coordinate system of the cup 102 ($P_x$) and any point in the coordinate system of the logo 104 ($P_y$) remains the same. As a result, when the cup is rotated or translated, the displacement between locations $P_x$, $P_y$ and remain the same. As a result, the displacement between $P_x$ and $P_y$ remains constant, and can be represented by activation of the same displacement cell D1.

Figure 3:
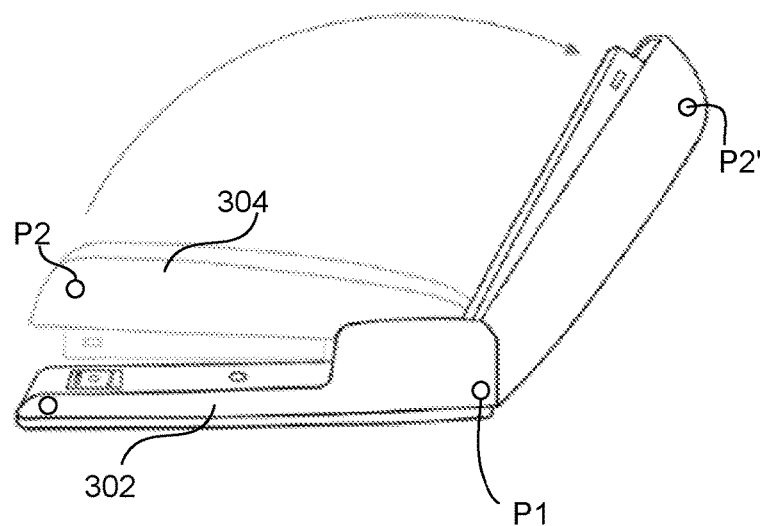
FIG. 3 illustrates an object having a lower body and an upper body hinged to the lower body, according to one embodiment.

In some examples, however, a new object may be represented by a combination of a first object that serves as a reference for a coordinate system, and a second object that moves relative to the first object. FIG. 3 illustrates a stapler having a lower body 302 and an upper body 304 hinged to the lower body, according to one embodiment. The lower body 302 of the stapler is associated with the object-centric coordinate system while the upper body 304 of the stapler rotates about a hinge at location P1. P2 represents a location at an end of the upper body 304 when the stapler is closed and P2' represents a location at the end of the upper body 304 when the stapler is opened.

Figure 4:
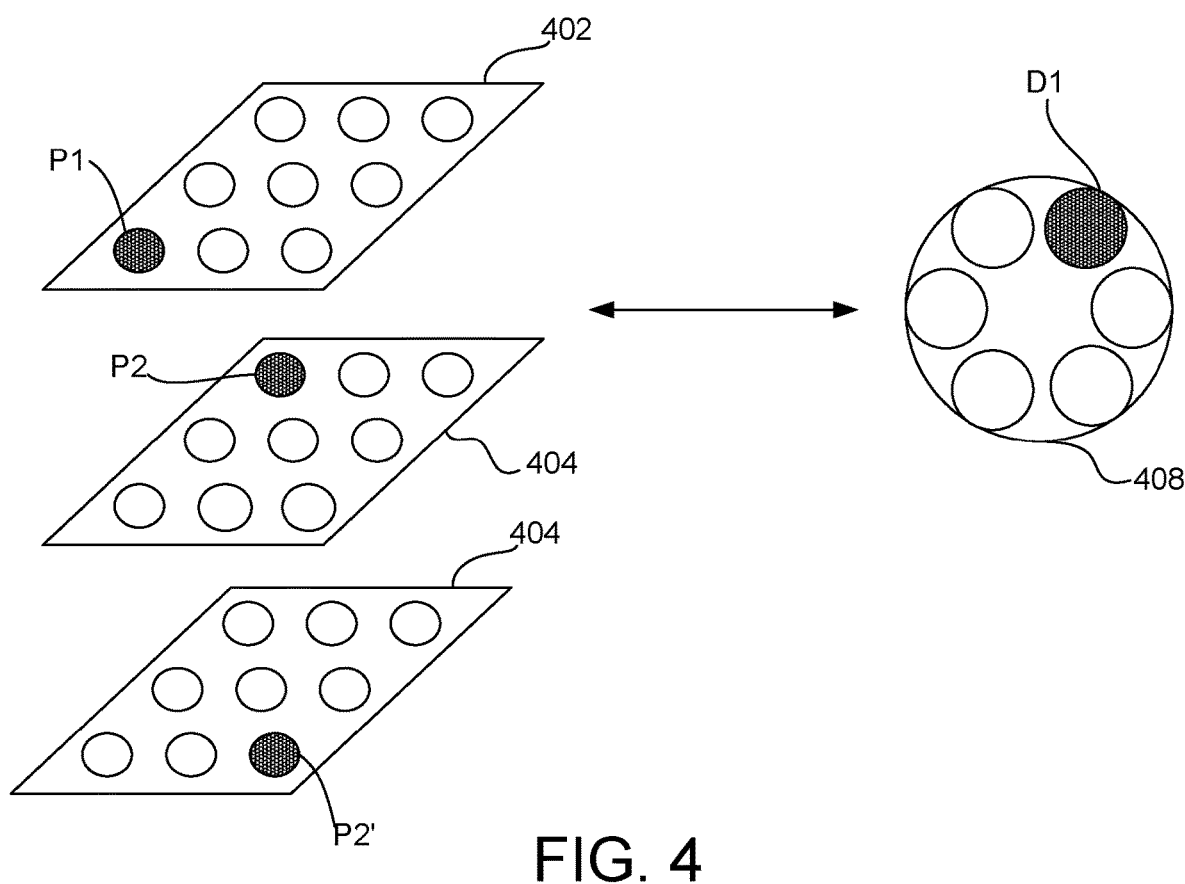
FIG. 4 is a conceptual diagram illustrating two sets of activated location cells and the resulting activated displacement cell, according to one embodiment.

FIG. 4 is a conceptual diagram illustrating two sets of activated location cells and the resulting activated displacement cell, according to one embodiment. FIG. 4 illustrates two sets of activated location cells 402, 404 and the resulting activated displacement cell D1, according to one embodiment. The angular displacement along the same pivot point between lower body 302 (e.g., location P1 at hinge) and locations of the end of the upper body 304 at various rotation angles of the upper body of the stapler (where the end of the upper body is represented, for example, by locations P2 and P2') may be represented by the same displacement cell in a circle 408. For example, the displacement cell D1 may be set to activate in both instances when (i) the attention is directed to the location P1 on the lower body 302 of the stapler and then the attention is shifted to the location P2 when the stapler is closed) and (ii) the attention is directed to the location P1 on the lower body 302 and then the attention is shifted to the location P2' when the stapler is opened.

In the example of FIG. 3 and FIG. 4, the displacement cell D1 indicating the displacement between the location P1 of the lower body 302 and the location P2, P2' of the upper body 304 would not change despite the change in the rotating between the lower body 302 and the upper body 304. Hence, the activation of displacement cell may be used to represent or index an object (e.g., a stapler) that includes two or more different objects (e.g., an upper body 302 and a lower body 304) at various orientations or movements relative to each other.

Architecture of Inference System

Figure 5:
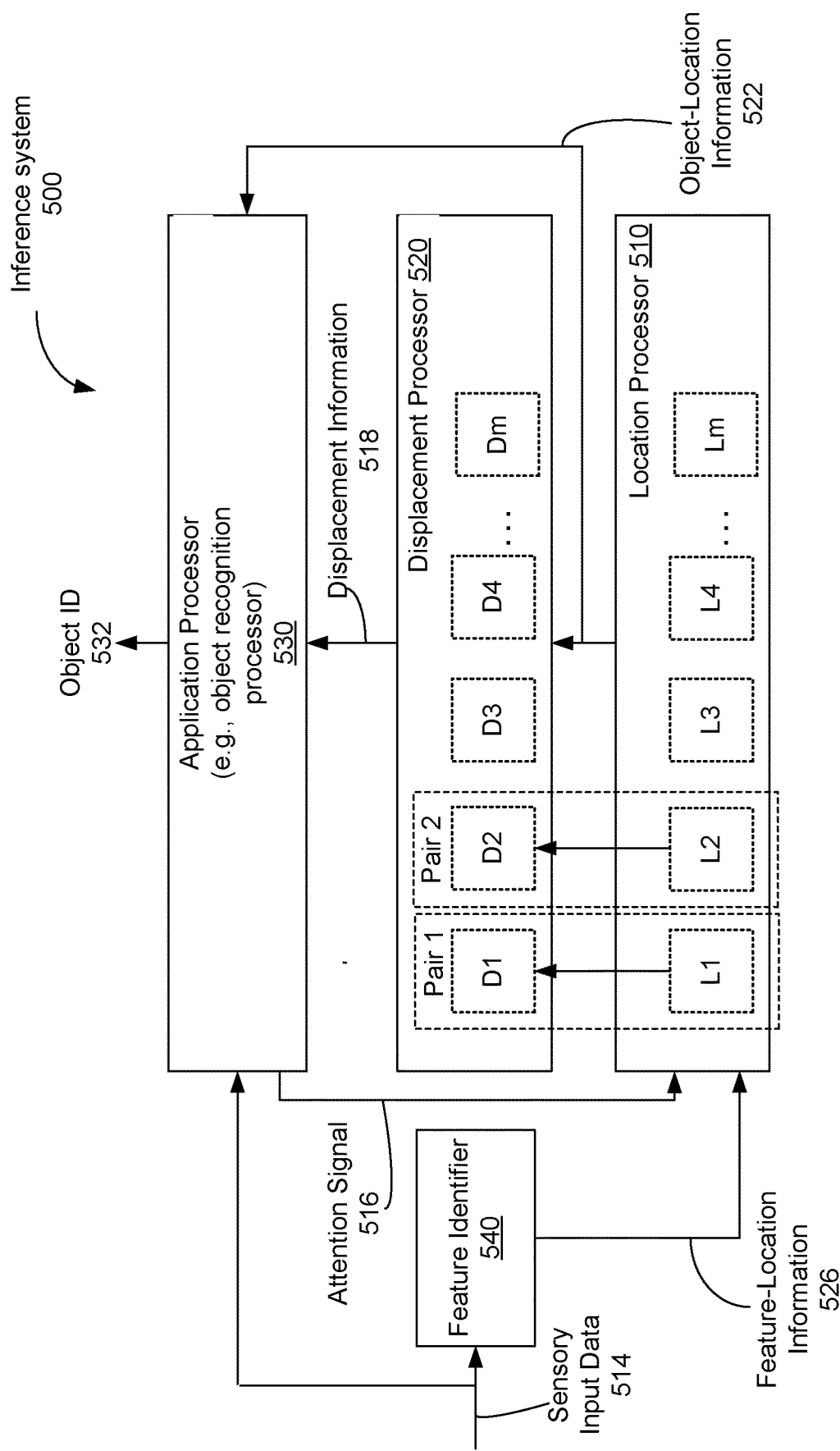
FIG. 5 is a block diagram illustrating an inference system, according to one embodiment.

FIG. 5 is a detailed block diagram illustrating an inference system 500, according to one embodiment. The inference system 500 may include, among other components a location processor 510, a displacement processor 520, an application processor 530, and a feature identifier 540. The inference system 500 determines a location of an object in an object-centric coordinate system based on information identifying features and their locations on the object.

The feature identifier 540 is a hardware, software or a combination thereof that receives sensory input data 514 recorded by a sensor or combination of sensors to describe an object. Sensory input data 514 may also be communicated to the application processor 530 to aid in the final identification of the object. The sensor or combination of sensors may be a tactile sensor or a combination of different types of sensors (e.g., a visual and a tactile sensor). In one embodiment, the sensory input data 514 identifies features of an object and may also identify locations on the object associated with a feature. In other embodiments, the locations of the object are derived by the feature identifier 540 or other components of the inference system 500 not illustrated in FIG. 5 (e.g., a controller for manipulating the sensor or sensors). The feature identifier 540 performs a combination of processing steps or techniques to identify the features detected by the sensory input data 514 and their location on the object.

The identity of a feature and the object-centric location of the feature are collectively referred to as "feature-location information" herein. Specifically, the feature identifier 540 is activated in response to receiving sensory input data 514 to provide feature-location information 526 to the location processor 510. Feature-location information may also be identified at various timesteps. For example, at a first timestep, sensory input data may identify a feature or a set of features associated with a cup (e.g., a handle of cup 102) and feature-location information 526 for the identified feature is communicated to the location processor. At a second timestep, sensory input data may identify a different feature or set of features on the same object (e.g., the center of the cylinder of the cup 102) or a different object (e.g., the "o" character of the logo 104). The application processor 530 recognizes that the feature identified in the first timestep is different from the feature identified in the second timestep. The application processor 530 generates an attention signal 516 indicating that the attention has been shifted to from one feature to another feature.

The location processor 510 is hardware, software or a combination thereof that receives the attention signal 516 and the feature-location information 526 to generate a representation of the location of the identified feature on the object. The location processor 510 includes a set of location modules L1 through Lm which generate object-location information 522 based on an attention signal 516 and feature-location information 526. Each of modules L1 through Lm has a set of location cells that is activated to represent a certain location on a certain object. Each location module and each location cell within the module represent a mapping of physical or logical space and objects in a coordinate system. Specifically, the set of modules may each represent any set of periodic points in the object or system-centric space with respect to the coordinate system of the module, in which the relative distances, orientations and coordinate systems between the points are characterized with respect to a set of mapping characteristics associated with the module. In one instance, each module includes one or more cells that represent the periodic points in the object or system-centric space.

Based on the feature-location information 526 and attention signal 516, one or more location cells across the set of location modules L1 through Lm may be activated. As described herein, activated location cells in a location module represent a mapping of the space and objects in a coordinate space, referred to as an "object-location." An object-location may be represented as a collection of activated location cells across the set of location modules.

In some embodiments, a location cell may be activated in some or all of location modules L1 through Lm. The activation of one or more location cells in a location module or set of location modules represents an object-location in a coordinate system. In some embodiments, some features may be common across multiple objects, for example, a string may be a common feature in a yo-yo and a needle and thread. As a result, the location cells activated in a first location module L1 in response to the detection of a string may not represent a unique object-location of a yo-yo. Feature-location information 526 identifying a second feature, a wheel, at a location attached to the string may cause the activation of a location cell in a second location module L2. Accordingly, the combination of the activated cells across L1 and L2 represents the unique location of the yo-yo in the coordinate system.

Different location modules in a location processor may have different mapping characteristics from one another in how they represent the relative location (e.g., relative distance and orientation) between points in an object-centric system. For example, location modules may differ with respect to the resolution or frequency in which the points are mapped to the space, the orientation of the coordinate system associated with the module, and the like. For example, for a given coordinate system orientation centered around the object, the cells of a first module may represent points that are 10 cm apart from each other in the object-centric space, while the cells of a second module may represent points that are 20 cm apart from each other in the object-centric space. Further, location cells along the same column or row in the different location modules may represent different locations along a tilted angle on the objects. Alternatively, locations cells in different location modules may represent locations in different coordinate systems (e.g., a polar coordinate system to a cartesian coordinate system).

Although a single cell in a module corresponds to multiple periodic locations in the object or system-centric space, a group of cells from different location modules may be sufficient to uniquely identify a particular location in the space. Thus, even though each module may have a small number of cells, the set of modules as a whole allow the inference system 104 to represent a significantly large number of locations in the space depending on the combination of cells that are selected from the set of modules that can greatly reduce the necessary computational infrastructure and learning.

The activated location cells representing an object-location representation for a first location relative to an object can be generated from an object-location representation for a second location relative to the object by shifting the activated cells of the second representation based on the distance from the second location to the first location. For example, for a feature positioned at P1, a first location cell L1 may be activated. If that same feature is translated 5 cm. to the right in an object-centric coordinate system to position P2, a second location cell L2 immediately to the right of L1 may be activated. As a result, the activated location cell L1 represents a different object-location than activated location cell L2. In most embodiments, the number of location cells included in a location module is fixed. The fixed number of cells represent one single "tile space" or in other words, a subset of the periodic points, in which points outside the tile space are additionally represented by cell in an additional tile space placed alongside the current tile space. For example, if a location module L1 includes three columns of location cells, a feature represented by an active cell in the third column that undergoes translation 5 centimeters to the right may be represented as an active cell in the same row of the first column.

The object-location represented by a set of active location cells in the location module may be communicated to other components of the inference system 500 as object-location information 522. Each instance of object-location information may be a unique characterization of a corresponding location, and can be sufficient alone to identify the type of object during inference. Accordingly, the location processor 510 communicates object-location information 522 directly to the application processor 530. Based on the received information 522, the application processor 530 may identify the type of object and generates an object ID 532. In other embodiments, object-location information 522 may represent an object within an allocentric frame of reference, or an object-centric frame of reference. That is, an object-location representation may indicate a location relative to the object itself (e.g., in the center of an object), rather than relative to the system containing the sensors.

Accordingly, object-location information 522 which includes an object-location representation for two objects within a coordinate system may be used to generate a combined object identification (e.g., the cup with logo 106). Returning to the example illustrated in FIG. 2, a first active cell in location module 202 represents a location P1 on a first object (i.e., the cup 102) and a second active cell in location module 204 represents a location P2 on a second object (i.e., the logo 104). Therefore, module 202A represents an object-location representation of the cup 120 which is the center of an object-centric system when the attention is directed to the cup 102, the same module 204B represents an object-location representation of the logo which is within the same coordinate system after the attention is shifted to the logo. The object-location information 522 describes the locations of both objects relative to each other. In such an embodiment, object-location information 522 may be communicated to the displacement processor 520 which determines displacement information describing the two objects relative to each other.

The displacement processor 520 includes a set of displacement modules D1 through Dm which generate displacement information 518 based on the object-location information 522. However, in other embodiments, there may be fewer or more modules depending on a combination of the number of sensors, the complexity of the object, or other relevant factors. Each displacement module of the displacement processor 520 is paired with a corresponding location module in the location processor 510, for example pair 1 includes L1 and D1, pair 2 includes L2 and D2, and so on. The displacement module of each pair activates one or more displacement cells based on the object-location information generated by the location module of the pair. The functionality of activated displacement cells is consistent with the above description of activated location cells in a location module, for example the fixed "tile space" configuration of cells in a location module.

Each displacement module and each displacement cell represent a relative mapping of two objects or more objects in a space around the sensor. Specifically, the set of modules may each represent a different set of displacements between features on two objects. For example, object-location information 522 identifying a location P1 of a first object and a location P2 of a second object may activate displacement cell D11 in a first displacement module. In comparison, the object-location information 522 updated to identify a location P3 of the first object and a location P2 of a second object may activate displacement cell D12 in a second displacement module. Thereby, based on the activated displacement cells, the inference system 500 may conclude that the displacement between P1, P2 and P1, P3 are not equal. Accordingly, different displacements between two objects may be represented using different combinations of displacement cells activated across an entire set of modules, rather than a displacement cells activate in a single module.

In some embodiments, a location on a first object may be moved relative to a location on second object without changing the magnitude of the displacement between the location on the first object and the location on the second object. Returning to the example illustrated in FIGS. 3 and 4, location P1 on the lower body 302 is the pivot point about which upper body 304 rotates. At a first relative position of the two objects, when the stapler is closed, the displacement between P1, P2 may be represented by a single activated displacement cell. As the upper body 304 rotates to different degrees over the pivot point P1, the location of P2 in an object-centric coordinate system also updates (represented as P2'). However, because P1 is a fixed point about which the upper body 304 rotates, the displacement between P1, P2' does not change from the displacement between P1, P2. Accordingly, both relative positions of the lower body 302 and upper body 304 may be represented by the same set of activated displacement cells. Because object-locations at different orientations may be represented by a common set of active cells in a displacement module, the inference system 500 may rely on active cells across a set of displacement modules to characterize the position of two objects relative to each other.

As described herein, activation states of displacement cells across displacement modules D1 through Dm are referred to as "displacement information 518." The displacement processor 520 communicates displacement information 518 to the application processor 530. Because the displacement information 518 represents the position of two objects relative to each other in a coordinate system, the application processor 530 may consider the displacement information 518 in combination with object-location information 522 to represent a combined object 106, for example a cup 102 with a logo 104. The application processor 530 aggregates object-location information 522 into representations of one or more objects in a coordinate system and interprets the displacement information 518 to position each object relative to each other in an object-centric coordinate system.

The application processor 530 receives sensory input data 514, object-location information 522, and displacement information 526. Based on the sensory input data 514 and object-location information 522, the application processor 530 identifies an object based on a set of features, and the location of each of those features on the object. In embodiments in which sensory input data 514 identified multiple objects, the application processor 530 identifies each object using and assigns an object ID 532 to each object. Additionally, the application processor 530 may interpret the displacement information 518 to describe the two objects relative to each other, thereby identifying a combined object and assigning a new object ID 532 to the combined object. Returning to the example illustrated in FIG. 1A through FIG. 1C, based on object-location information 522, the application processor 530 may generate a first object ID 532 identifying the cup 102 based on a set of features (e.g., handle and cylindrical body) and a second object ID 532 identifying the logo 104. Additionally, based on object-location information 522 and displacement information 518, the application processor 530 may generate a combined object ID 532 identifying a cup with a logo.

Example Architecture of Location Processor

Figure 6:
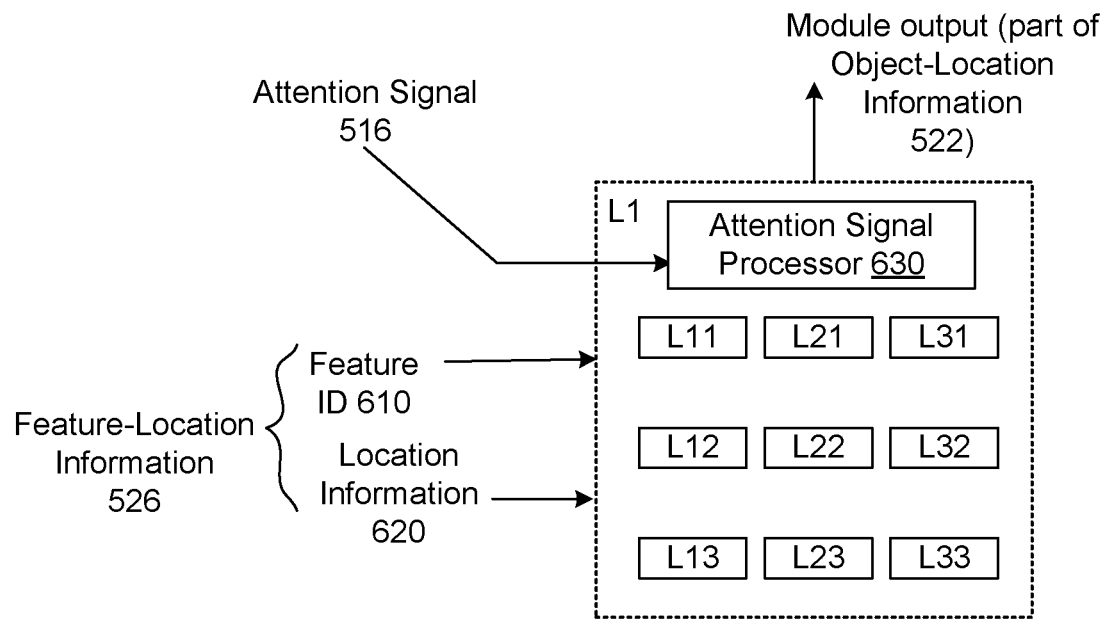
FIG. 6 is a block diagram illustrating a location module, according to one embodiment.

FIG. 6 is a block diagram illustrating a location module L1, according to one embodiment. As a described above with reference to FIG. 5, each location module comprises a plurality of location cells L11, L21, L31, L12, L22, L32, L13, L23, and L33, conceptually arranged in rows and columns.

Location cells may be re-used for activation as additional movements are made for the sensory input data 514. In other words, the object-centric space may be represented by tiling the cells of the module alongside each other in a repeated manner. For example, responsive to a shift in location 10 cm downwards, the activation state of cells in location module L1 may shift from cell L12 to cell L13. In embodiments in which there are no other cells past cell L13 within a given tile space and cell L11 is the next cell downwards if another set of cells were placed below the current set of cells, L1 would be activated. Similarly, in embodiments in which the location shift 10 cm to the right, the activate state of cells in module L1 may shift from L12 to L22. If there are no other cells past L32 within a given tile space and cell L12 is the next cell to the right if another set of cells were placed adjacent to the current set of cells, L12 would be activated.

The attention signal 516 received from the application processor 530 contains instructions for the location module L1 to direct attention to a specific feature. The attention signal 516 is processed by the attention signal processor 630 to interpret the instructions to direct attention of the location processor 510. The location module L1 receives location information 526 which includes a feature ID 610 and location information 620. The feature ID 610 identifies the feature on which the module was instructed to focus, for example a handle of a cup. The location information 620 describes the location of a feature on an object, for example as a coordinate value or, in embodiments in which the sensor moves, a delta value. Based on the feature ID 610 and the location information 620, one or more location cells are activated to represent the identified feature and its location on an object (e.g., a feature-location). For example, feature-location information 526 identifying a first point on the cylindrical surface of a cup may result in the activation of location cell L11, whereas a feature-location information 526 identifying a second (i.e., different) point on the cylindrical surface of a cup may result in the activation of location cell L21. If the feature-location information 526 can indicate more than one possibility objects in line with the same feature-location information, more than one location cell may be activated to represent such possibility. As further feature-location information 526 is received, the number of active locations cells may be reduced and thereby represent narrowing of possible objects.

Other location modules L2 through Lm may have the same or similar architecture as location module L1.

Figure 7:
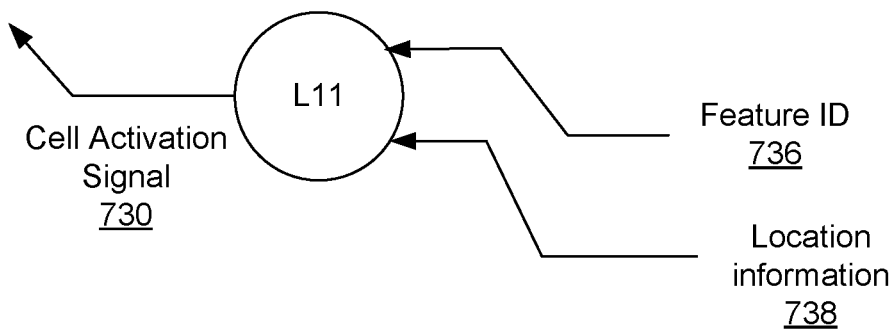
FIG. 7 is a conceptual diagram illustrating signals associated with a cell in the location processor, according to one embodiment.

FIG. 7 is a conceptual diagram illustrating signals associated with a location cell L11 in the location processor 510, according to one embodiment. The location cell L11 may be a physical or logical construct that takes one of inactive, or active state based on its previous state and various signals that it receives. As discussed with reference to FIG. 6, location cell L11 receives a feature ID 736 indicating an identification of the feature detected by sensory input data. Also, as discussed with reference to FIG. 6, location cell L11 receives location information 738 describing the position of the identified feature on an object. Based on the combination of feature ID 736 and location information 738 the location cell L11 is placed in either an active or inactive state. The location cell produces a cell activation signal 730 indicating whether the location cell was activated or inactivated. Each location cell in a location module receives a similar set of inputs and generates a cell activation signal 730. As a result, a set of activated location cells in a module represent a unique identifier of a certain feature at a certain location on an object.

Other location cells L21, L31, L12, L22, L32, L13, L23, and L33 in the same location module L1 may have the same or similar architecture as location cell L11.

Example Architecture of Displacement Processor

Figure 8:
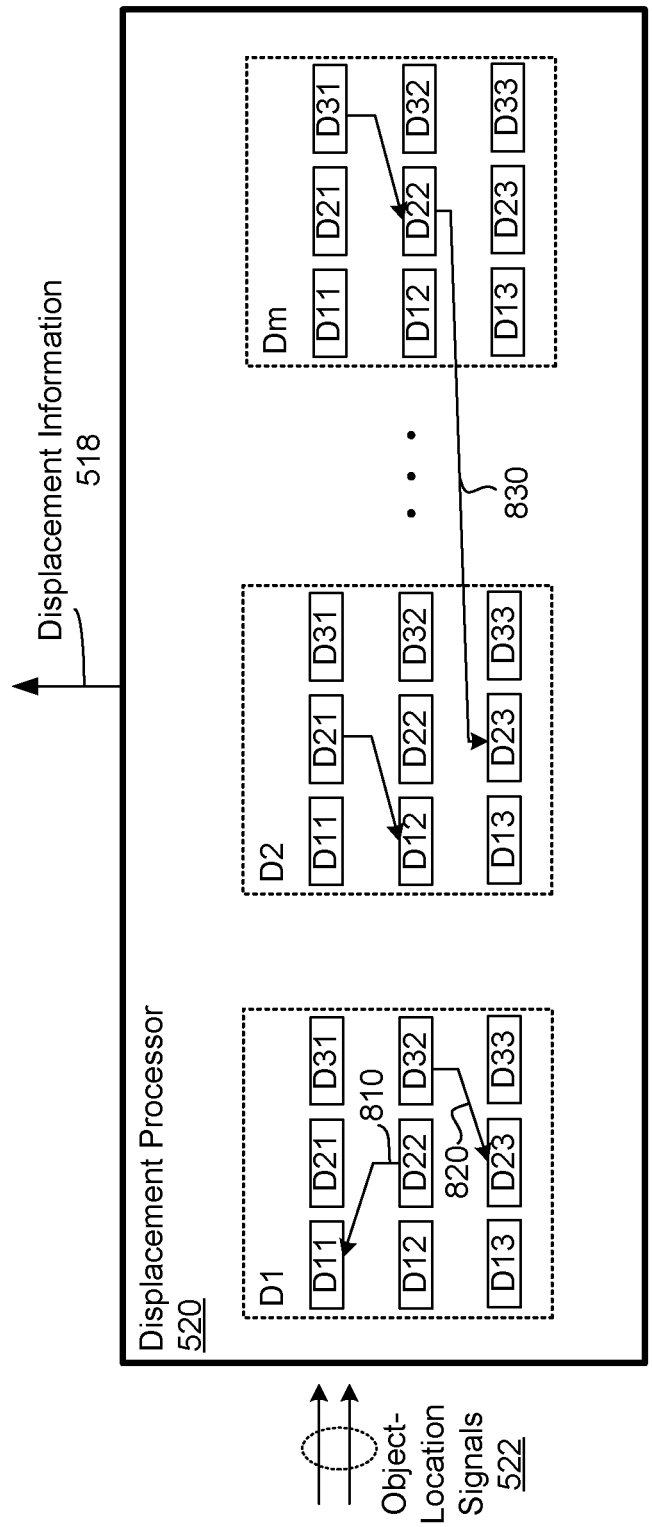
FIG. 8 is a detailed block diagram illustrating a displacement processor, according to one embodiment.

FIG. 8 is a detailed block diagram illustrating a displacement processor 520, according to one embodiment. A displacement processor may include, among other components, a set of displacement modules D1 through Dm. Each displacement module may correspond to a location module and may include one or more displacement cells D11 through D33. However, the displacement cells in FIG. 8 are merely illustrative, and in practice, a displacement module can be organized into arrangements of a higher dimension, such as a three-dimensional arrangement of cells that correspond to the three-dimensional space of an object-centric or system-centric space.

The displacement modules D1 through Dm of the displacement processor 520 receive object-location signals 522 from the corresponding location modules L1 through Lm of the location processor 510. For example, in the embodiment shown in FIG. 8, the set of modules D1 through Dm may receive object-location signals 522 from the location processor 510. The object-location signals 522 are fed to a subset of displacement cells in the displacement processor 520 with connections to the location cells that originate the object-location signals 522. The object-location signals 522 indicate activation states of location cells in the location processor 510.

Different displacement modules D1 through Dm may include the same number of displacement cells or different number of displacement cells. Different displacement cells may represent different displacements between two features of an object within an object-centric coordinate system. Displacement information 518 corresponds to a subset of activated cells in the displacement processor 520. In one instance, displacement cells of the displacement processor 520 become active in response to receiving object-location signals 522 from the corresponding modules of the location processor 510 which indicate activation of location cells in the location processor 510. Based on the change of object-location information 522 indicating a shift in attention from one feature to another feature, one or more displacement cells may be activated as to describe the displacement between the two features. Each combination of activated displacement cells in different displacement modules D1 to Dm represents a unique displacement between the two features. Hence, the displacement information 518 representing the activation states of displacement cells in different displacement modules D1 to Dm may be used to indicate an object with a certain displacement between its two features. The features for activating the displacement cells may be located on the same object or different objects. In embodiments in which features are located on different objects, displacement information 518 may be used to indicate a certain displacement between features or objects within the same environment.

Displacement cells within a displacement module may also be activated in response to intra-module signals. An activated cell in the displacement module can provide intra-module signals to other cells via the connections to indicate activation of the cell. Responsive to activation of one displacement cell, another displacement cell in the module may become activated if it receives both an intra-module signal from the activated displacement cell and/or object-location signals 522 from locations cells connected to the other displacement cell. After the other displacement cell has been activated, the previously activated displacement cell may be placed in an inactive state or remain in an active state. In the illustrated embodiment of FIG. 8, the activation of displacement cell D22 in module D1 communicates an intra-module signal 810, which causes the activation of displacement cell D11. Similarly, the activation of displacement cell D32 in module D1 communicates an intra-module signal 820, which activates displacement cell D23 in module D1. Similar intra-module communications are illustrated in displacement modules D2 and Dm by arrows within the displacement modules.

Figure 9:
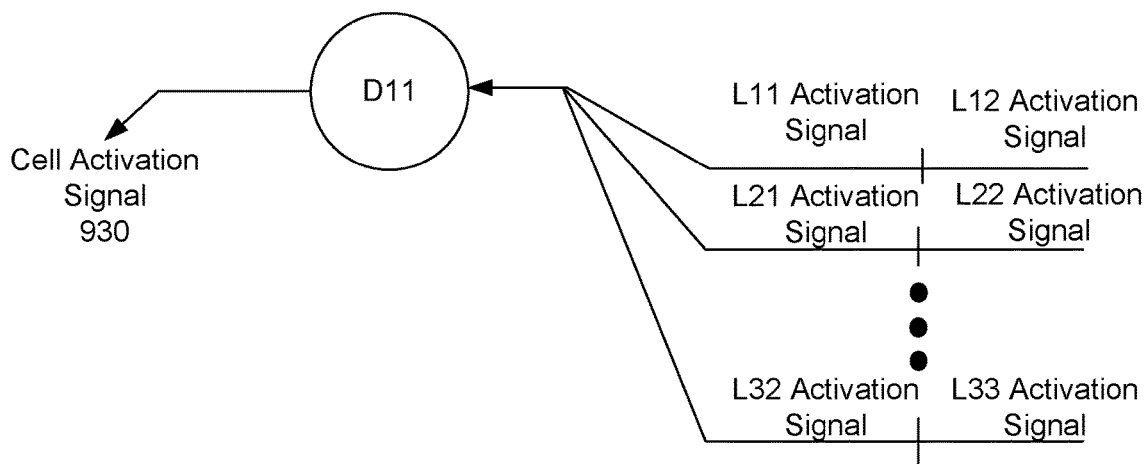
FIG. 9 is a conceptual diagram illustrating a displacement cell receiving activation signals from a location processor, according to one embodiment.

In addition to intra-module signals, a displacement module may receive inter-module signals from one or more displacement modules within a displacement processor. The activation of displacement cells in response to inter-module signals is consistent with the description above regarding intra-module signals. In the illustrated embodiment of FIG. 8, the activation of displacement cell D22 in displacement module Dm communicates an inter-module signal 830 which causes the activation of displacement cell D23 in displacement module D2. After the displacement cell D23 has been activated, the previously activated displacement cell in the same displacement module may be placed in an inactive state or remain in an active state FIG. 9 is a conceptual diagram illustrating a displacement cell D11 receiving activation signals from the location processor 510, according to one embodiment. The displacement cell D11 may be a physical or logical construct that takes one of inactive or active state based on its previous state and various signals that it receives. As discussed with reference to FIG. 8, displacement cell D11 receives a series of activation signals from activated location cells in the location processor 510. Displacement cell D11 has branches (also referred to as "dendrites") that receive activation signals from location cells connected to displacement cell D11. For example, location cells L11 and L12 are active and connected to the first branch of the displacement cell D11. When location cell L12 is activated followed by location cell L11, the displacement cell D11 is activated. Alternatively, the displacement cell D11 activates when activation of location cell L22 is followed by activation of location cell L21 (as represented by the second branch), and also activates when activation of location cell L33 is followed by location cell L32 (as represented by the last branch). The displacement cell D11 produces a cell activation signal 930 indicating whether the cell was activated or inactivated. Each displacement cell in a displacement module receives a similar set of activation signals from other locations cells and generates a cell activation signal 930.

Figure 10:
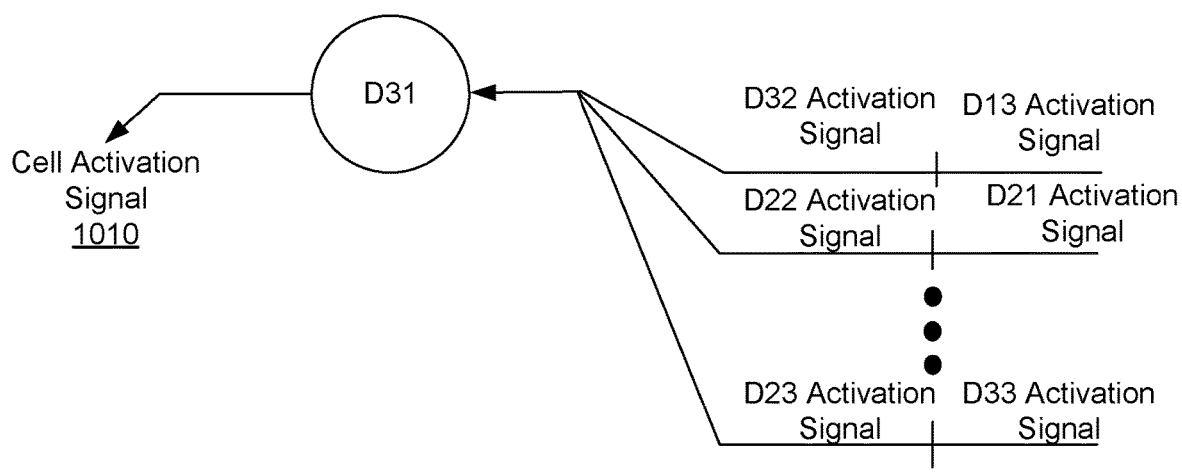
FIG. 10 is a conceptual diagram illustrating a displacement cell receiving lateral signal within the displacement processor, according to one embodiment.

FIG. 10 is a conceptual diagram illustrating a displacement cell D31 receiving lateral signals within the displacement processor 520, according to one embodiment. A lateral signal may be an intra-module signal or a inter-module signal as described above with reference to FIG. 8. Similar to the description of the displacement cell in FIG. 9, displacement cell D31 has branches (also referred to as "dendrites"). Similar to the displacement cell D11 of FIG. 9, the displacement cell D31 is activated when a certain sequence of cell activation signals is received from other displacement cells (for example, activation of D13 cell followed by activation of D32 cell, as represented by the first branch).

Example Operation and Function of Cells in Location Processor

Figure 11A:
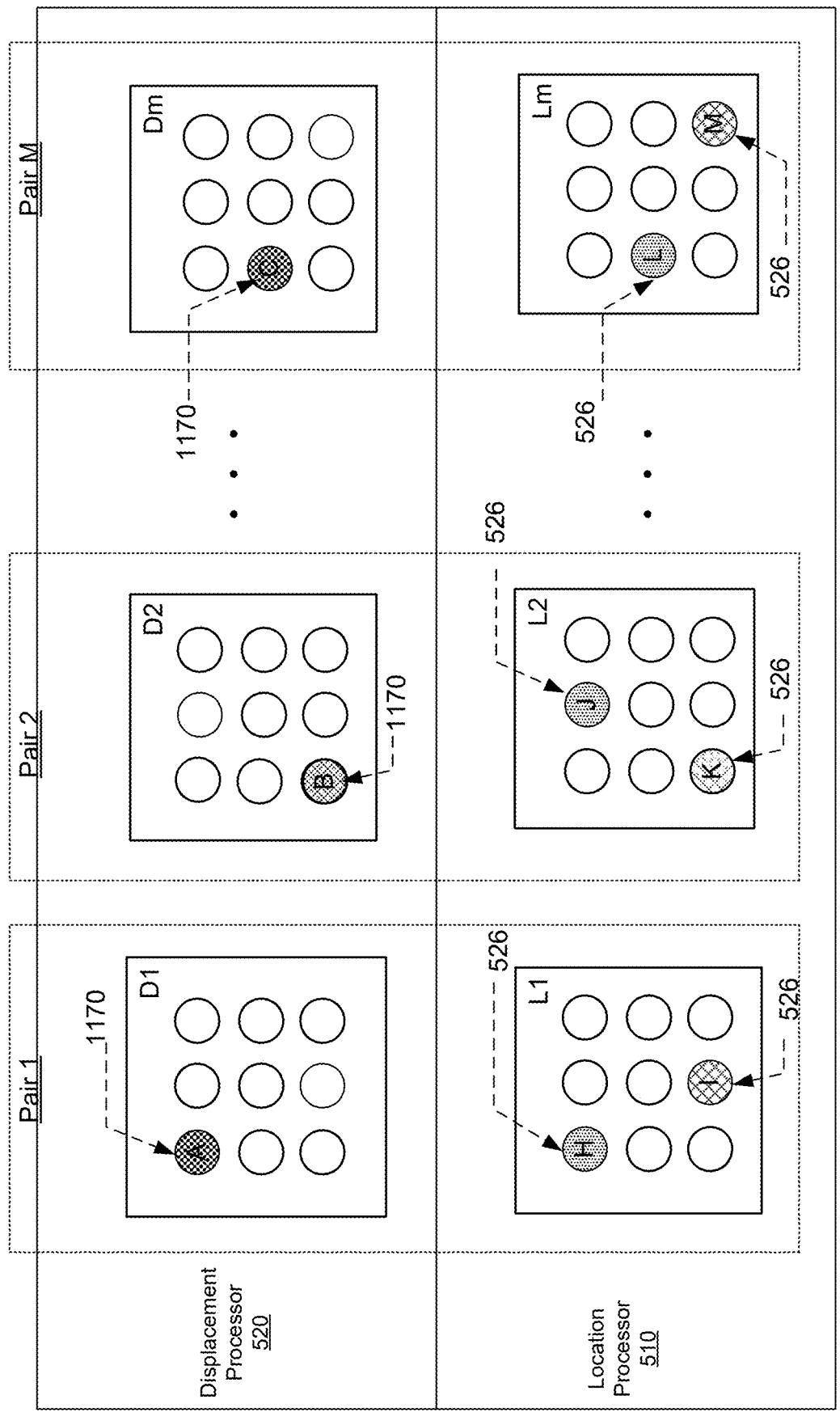
FIG. 11A is a diagram illustrating example activation states of cells in the location processor and the displacement processor, according to one embodiment.
Figure 11B:
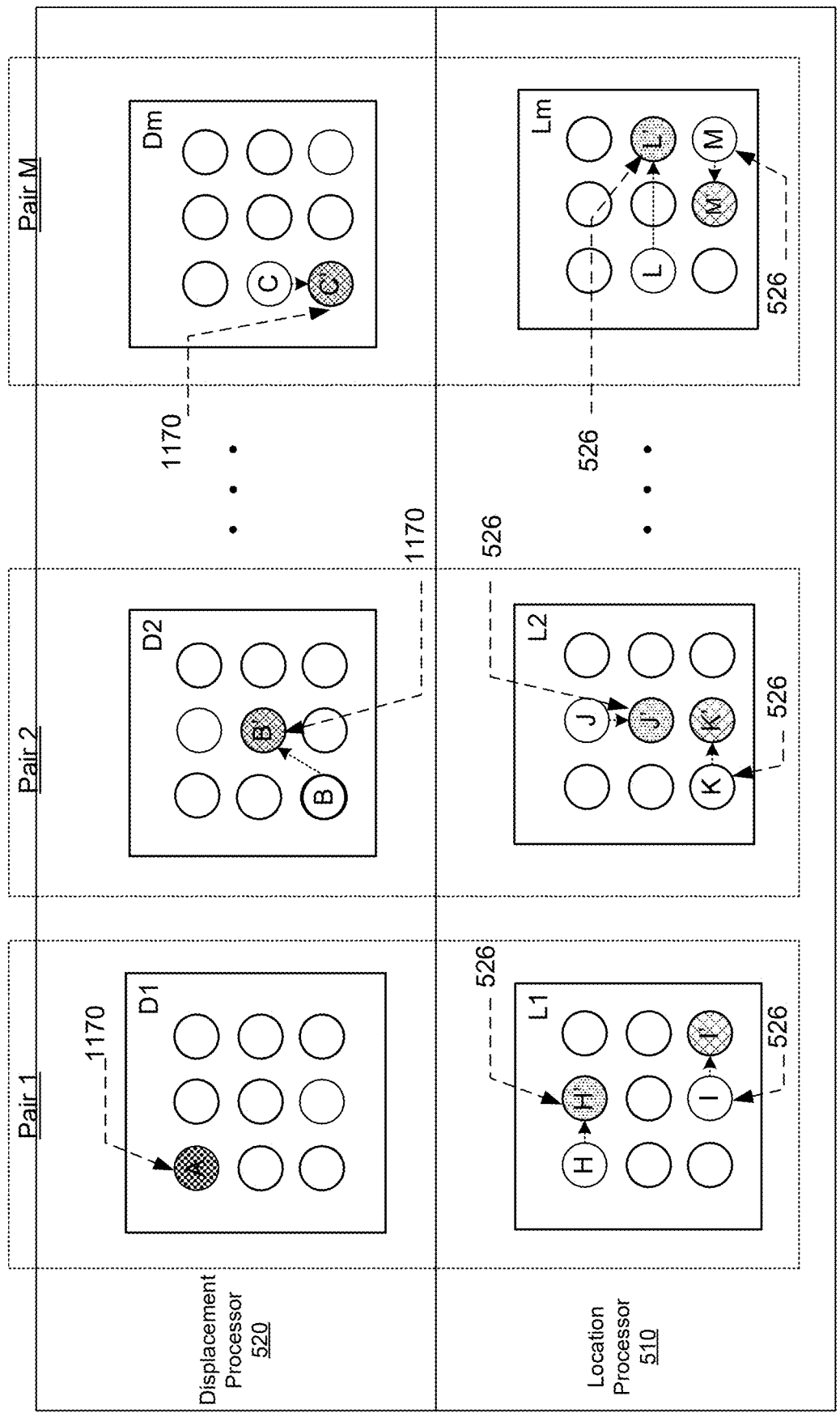
FIG. 11B is a diagram illustrating adjustments in the active cells in the displacement processor in response to shifts in the location of features on a first and second object, according to one embodiment.

FIGS. 11A and 11B are diagrams illustrating example activation states of cells in the location processor 510 and the displacement processor 520, according to one embodiment. Specifically, FIGS. 11A and 11B show cells in a set of location modules L1 through Lm and displacement modules D1 through Dm modules corresponding to a sensor. Each circle represents a cell in a corresponding module. Each module collectively refers to a paired set of location module and displacement module. In the location processor, location cells become active in response to signals includes feature-location information 526. Once active, location cells emit location cell activation signals 1170 which are received at the displacement processor 520. Displacement cells are activated in response to receiving certain location cell activation signals 1170 from the paired location module. For sake of simplicity, FIGS. 11A through 11D show an example inference process for a set of modules for a single sensor.

FIG. 11A illustrates a set of modules receiving feature-location information 526 indicating the identity and location of features detected by a sensor. As illustrated in FIG. 11A, in location module L1, location cells H and I are activated in response to feature-location information 526. In location module L2, location cells J and K are activated in response to feature-location information 526. In location module L3, location cells L and M are activated in response to feature-location information 526. The feature-location information 526 places the above listed location cells in an active state. The pair of active location cells in each module of the location processor 510 represents features at locations on a pair of objects. In particular, active cells H, J, and L in the location modules L1, L2, and Lm, respectively, represent features at locations on a first object. For the sake of simplicity, active location cells associated with a first object are shaded in. Active cells I, K, and M in location module L1, L2, and Lm, respectively, represent features at locations on a second object. For the sake of simplicity, active location cells associated with a second object are shaded using cross-hatchings. The combination of activated location cells H, J, and L describes a set of features of the first object and the location of each of those features on the first object. Accordingly, activated location cells H, J, and L across location modules L1, L2, and Lm represent an inference as to the structure, and therefore the identity, of the first object. Similarly, the combination of activated location cells I, K, and M describe a set of features on the second object and the location of each of those features on the second object. Accordingly, activated location cells across location modules L1, L2, and Lm represent information on aspects of the second object. As described above with reference to FIG. 5, the object-location information comprised of the activated location cells may be processed by the application processor 530 to infer the identify of each of the first and second objects.

In each location module, the pair of activated location cells generate a location cell activation signal 1170. As described above with reference to FIG. 9, the location cell activation signal is a series of activation signals from activated location cells in the location processor 510. In pair 1, displacement module D1 receives a location cell activation signal 1170 comprised of a series of signals including an H activation signal and an I activation signal from location cells H and I. The location cell activation signal 1170 activates a single displacement cell A in the paired displacement module D1 of the displacement processor 520. Accordingly, active displacement cell A describes the location of a feature H on the first object relative to a feature I on the second object. In pair 2, displacement module D2 receives a location cell activation signal 1170 comprised of a series of signals including a J activation signal and a K activation signal from location cells J and K. The location cell activation signal 1180 activates displacement cell B in the paired displacement module D2 of the displacement processor 520 which describes the location of a feature J on the first object relative to a feature K on the second object. In pair M, displacement module Dm receives a location cell activation signal 1170 including an L activation signal and a K activation signal from location cells L and K. The location cell activation signal 1170 actives displacement cell C in the paired displacement module Dm of the displacement processor 520 which describes the location of a feature L on the first object relative to a feature M on the second object.

FIG. 11B is a diagram illustrating adjustments in the active displacement cells in the displacement processor 520 in response to shifts in the location of features on a first and second object, according to one embodiment. In the location module L1 of the location processor 510, both features are moved through a vertical shift over the same distance. Accordingly, active location cells H and I are both shifted one unit to the right, such that location cells H' and I' are activated. However, despite the movement, the displacement between the features does not change. Therefore, when location cells H' and I' are activated based on feature-location information 526, the location cell activation signal 1170 comprising an H' activation signal and an I' activation signal from location cells H' and I' still activates displacement cell A.

In comparison, the activated cells in location module L2 of Pair 2 indicate different movement on a first object and a second object. The moving of feature J on the first object one cell down results in the activation of location cell J'. In comparison, the moving of feature K on the second object one cell to the right results in the activation of location cell K'. Accordingly, the displacement between active location cells K' and J' differs from the displacement between previously activated location cells J and K. The location cell activation signal 1170 comprising a J' activation signal and K' activation signal from location cells J' and K' activates displacement cell B' in displacement module D2 rather than displacement cell B. Consistent with the description above related to Pair 2, the activated cells in location module Lm of Pair M indicate different movements between features on a first object and a second object. The movement of feature L on the first object two units to the right results in the activation of cell L'. In comparison, the moving of feature M on the second object one cell to the left results in the activation of location cell M'. Accordingly, the updated location cell activation signal 1370 activates the displacement cell C' in displacement module Dm rather than displacement cell C.

Figure 12:
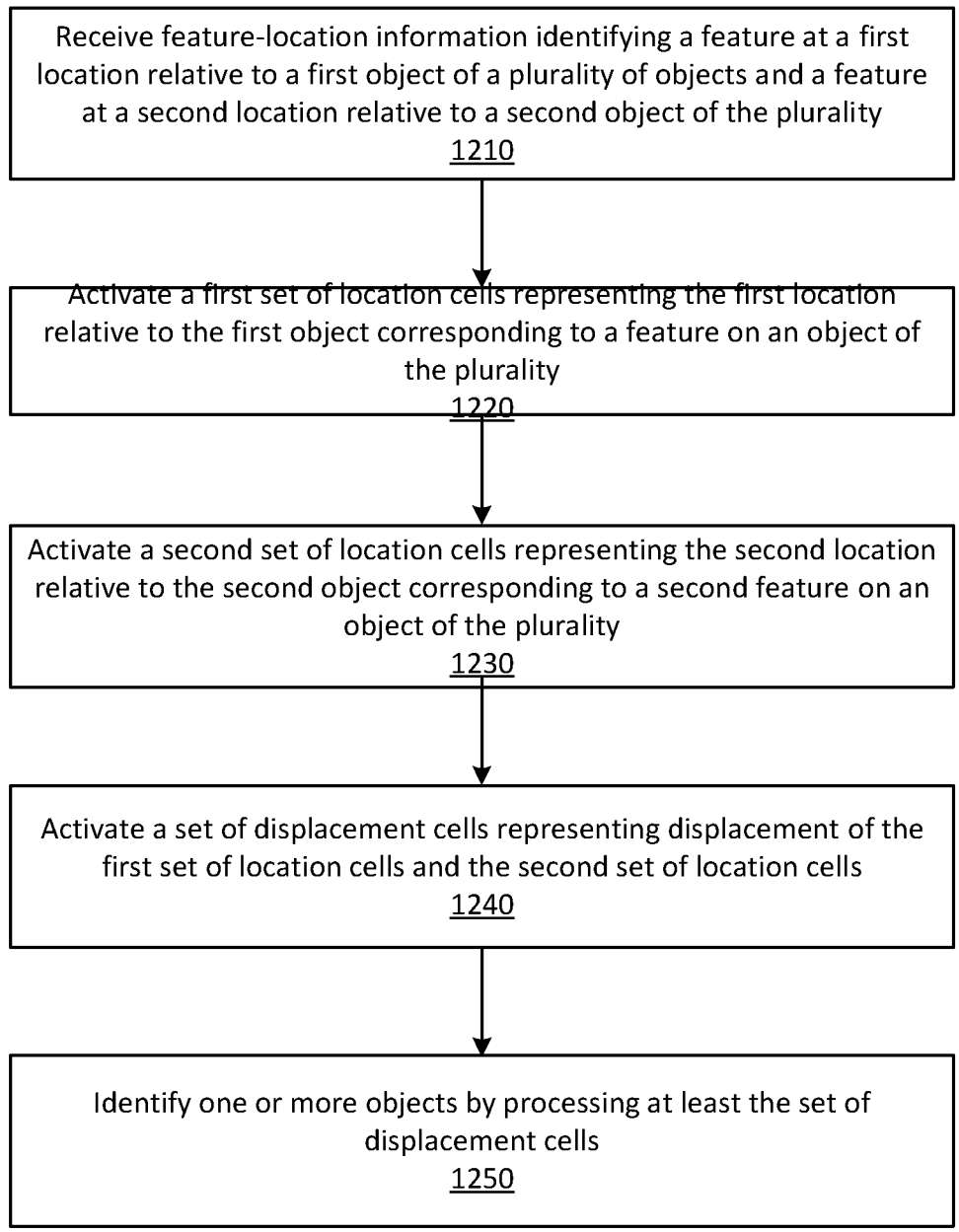
FIG. 12 is a flowchart illustrating a process of performing inference using displacement information, according to one embodiment.

FIG. 12 is a flowchart illustrating a process of performing inference using displacement information, according to one embodiment. The inference system, for example the inference system 500, receives 1210 feature location information identifying a feature at a first location in an object-centric coordinate system of a first object of a plurality of features and a feature at a second location in an object-centric coordinate system of a second object of the plurality of features. As described with reference to FIG. 12, the first location and the second location represent the same physical location.

Based on the feature-location information identifying the first location on the first object, the inference system activates 1220 a first set of location cells that collectively represent a feature on the first object corresponding to the first location in the coordinate system of the first object.

Similarly, based on the feature-location information identifying the second location on the second object, the inference system activates 1230 a second set of location cells that collectively represent a feature on the second object corresponding to the second location in the coordinate system of the second object. When activated, each location cell of the first and second set enter an activated state.

In embodiments in which the first location and the second location represent different physical locations, the inference system applies path integration techniques to compute a location in the coordinate system of the first object representing the same physical location as the second location relative to the second object. To represent the computed location, the inference system activates a set of location cells that collectively represent a feature on the first object corresponding to the first location on the first object. Alternatively, the inference system may apply path integration techniques to compute a location in the coordinate system of the second object representing the same physical location as the first location relative to the first object.

In response to receiving the activate states of the first set of location cells, followed by the activation states of the second set of location cells, the inference system activates 1240 a set of displacement cells representing a displacement of the first set of location cells and the second set of location cells.

Because the displacement information 518 represents the position of two objects relative to each other in a coordinate system, the application processor 530 may consider the displacement information 518 in combination with object-location information 522 to represent a combined object 106, for example a cup 102 with a logo 104. Accordingly, the inference system identifies 1250 one or more objects by processing at least the set of displacement cells.

Figure 13:
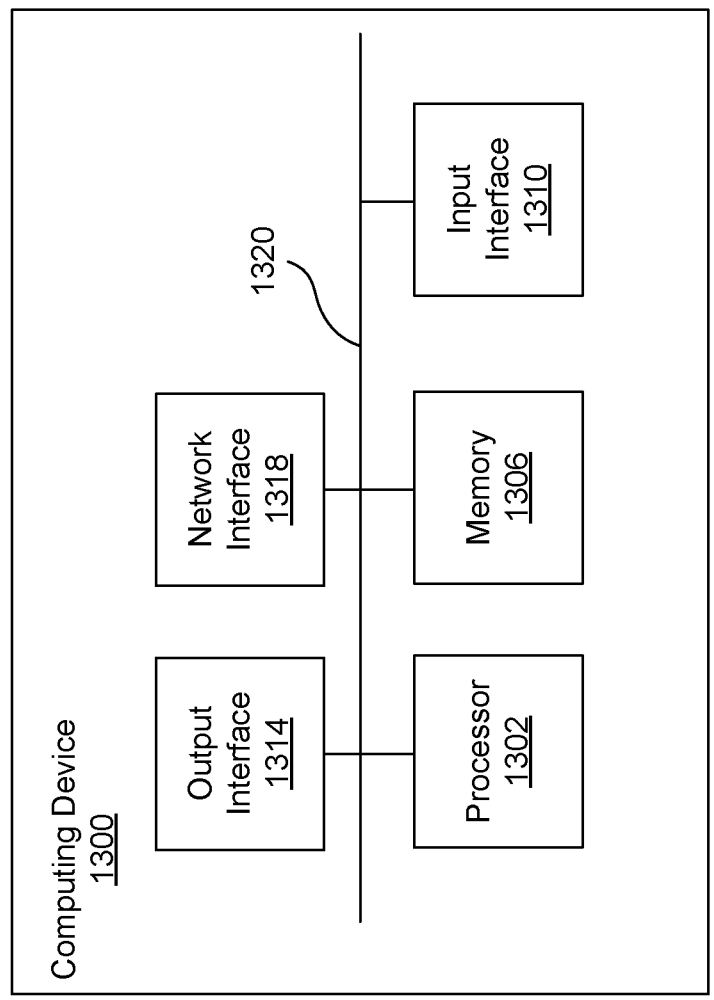
FIG. 13 is a block diagram of a computing device for implementing inference systems according to embodiments.

FIG. 13 is a block diagram of a computing device 1300 for implementing inference systems according to embodiments. The computing device 1300 may include, among other components, a processor 1302, a memory 1306, an input interface 1310, an output interface 1314, a network interface 1318, and a bus 1320 connecting these components. The processor 1302 retrieves and executes commands stored in memory 1306. The memory 1306 store software components including, for example, operating systems and modules for instantiating and executing nodes as described herein. The input interface 1310 receives data from external sources such as sensor data or action information. The output interface 1314 is a component for providing the result of computation in various forms (e.g., image or audio signals). The network interface 1318 enables the computing device 1300 to communicate with other computing devices by a network. When multiple nodes or components of a single node is embodied in multiple computing devices, information associated with temporal sequencing, spatial pooling and management of nodes may be communicated between computing devices via the network interface 1318.

Upon reading this disclosure, those of skill in the art will appreciate still additional alternative designs for processing nodes. Thus, while particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed:

1. A method of performing inference, the method comprising:
   receiving first feature-location information identifying a first feature and a first location of the first feature;
   activating a first set of location cells in a location processor to indicate first candidate objects having the first feature at the first location, responsive to receiving the feature-location information;
   receiving second feature-location information identifying a second feature and a second location of the second feature;
   activating a second set of location cells in the location processor to indicate second candidate objects having the second feature at the second location, subsequent to activating of the first set of location cells,
   activating a set of displacement cells in a displacement processor to represent displacement of the first set of locations cells and the second set of locations cells, responsive to receiving activation states of the first location cells followed by activation states of the second location cells from the location processor; and
   identifying one or more objects from the first and second candidate objects according to the set of activated displacement cells.

2. The method of claim 1, wherein the first set of location cells represents a periodic point in a coordinate space centered around the first candidate objects and the second set of location cells represents a distinct periodic point in a coordinate space centered around the second candidate objects.

3. The method of claim 1, further comprising:
   receiving sensory input data of an unknown object from a tactile or visual sensor; and
   identifying the first feature-location information and the second feature-location feature of the unknown object based on the received sensory input data.

4. The method of claim 1, further comprising:
   generating an attention signal indicating a shift from the first feature at the first location to the second feature at the second location; and
   activating a third set of location cells responsive to receiving third feature-location information identifying the second feature at the second location and the generation of the attention signal, the third set of location cells collectively representing the second location on the first candidate objects.

5. The method of claim 4, wherein the first location is a translational shift from the second location and the first set of location cells represent the translational shift relative to the third set of location cells.

6. The method of claim 3, further comprising:
   responsive to the activation of the first set of location cells, determining object-location information representing the first location in a coordinate space centered around a sensor generating the sensory input data;
   responsive to the activation of the second set of location cells, determining object-location information representing the second location in the coordinate space; and
   determining displacement information based on the object-location information representing the first location and object-location information representing the second location, the displacement information representing relative positions of the first candidate objects relative to the second candidate objects in the coordinate space; and identifying the first candidate objects and the second candidate objects based on the object-location information and the displacement information.

7. The method of claim 6, further comprising:
generating an attention signal indicating a shift from the first feature to the second feature; and
determining the displacement information based on the object-location information representing the first location and the object-location information representing the second location, and the attention signal.

8. The method of claim 1, further comprising:
activating at least a first displacement cell of the set of displacement cells responsive to activating of the first set of location cells followed by activating of the second set of location cells;
sending an intra-module signal from the first displacement cell to a second displacement cell of the set of displacement cells; and
activating the second displacement cell responsive to receiving of the intra-module signal, activation of the second displacement cell generating a cell activation signal indicating an activated state of the second displacement cell for identifying the one or more objects from the first and second candidate objects.

9. The method of claim 1, further comprising:
activating a first displacement cell of the set of displacement cells responsive to activating of the first set of location cells followed by activating of the second set of location cells;
sending an intra-module signal to a displacement cell excluded from the set of displacement cells; and
deactivating the displacement cell excluded from the set of displacement cells responsive to receiving of the intra-module signal, deactivation of the excluded displacement cell generating a cell activation signal indicating a deactivated state of the excluded displacement cell for identifying the one or more objects from the first and second candidate objects.

10. An apparatus for performing inference, comprising:
a location processor comprising a plurality of location modules, each location module of the plurality further comprising a plurality of location cells, the location processor configured to:
receive first feature-location information identifying a first feature and a first location of the first feature;
activate a first set of location cells of the plurality in the location processor to indicate first candidate objects having the first feature at the first location, responsive to receiving the feature-location information;
receive second feature-location information identifying a second feature and a second location of the second feature; and
activate a second set of location cells in the location processor to indicate second candidate objects having the second feature at the second location, subsequent to activating of the first set of location cells;
a displacement processor comprising a plurality of displacement modules, each displacement module of the plurality further comprising a plurality of displacement cells, the displacement processor configured to:
activate a set of displacement cells in the displacement processor to represent displacement of the first set of locations cells and the second set of locations cells, responsive to receiving activation states of the first location cells followed by activation states of the second location cells in the location processor; and an application processor configured to:
identify one or more objects from the first and second candidate objects according to the set of activated displacement cells.

11. The apparatus of claim 10, wherein the first set of location cells represents a periodic point in a coordinate space centered around the first candidate objects and the second set of location cells represents a distinct periodic point in a coordinate space centered around the second candidate objects.

12. The apparatus of claim 10, further comprising comprises at least one of a tactile sensor or a visual sensor, and the location processor is further configured to:
receive sensory input data of an unknown object from a tactile or visual sensor; and
identify the first feature-location information and the second feature-location feature of the unknown object based on the received sensory input data.

13. The apparatus of claim 10, wherein the location processor is further configured to:
generate an attention signal indicating a shift from the first feature at the first location to the second feature at the second location; and
activate a third set of location cells responsive to receiving third feature-location information identifying the second feature at the second location and the generation of the attention signal, the third set of location cells collectively representing the second location on the first candidate objects.

14. The apparatus of claim 13, wherein the first location is a translational shift from the second location and the first set of location cells represent the translational shift relative to the third set of location cells.

15. The apparatus of claim 12, wherein:
the location processor is further configured to:
responsive to the activation of the first set of location cells, determine object-location information representing the first location in a coordinate space centered around a sensor generating the sensory input data;
responsive to the activation of the second set of location cells, determine object-location information representing the second location in the coordinate space; and
the displacement processor is further configured to:
determine displacement information based on the object-location information representing the first location and object-location information representing the second location, the displacement information representing relative positions of the first candidate objects relative to the second candidate objects in the coordinate space; and
the application processor is further configured to:
identify the first candidate objects and the second candidate objects based on the object-location information and the displacement information.

16. The apparatus of claim 15, wherein:
the location processor is further configured to generate an attention signal indicating a shift from the first feature to the second feature; and
the application processor is further configured to the displacement information based on the object-location information representing the first location and the object-location information representing the second location, and the attention signal.

17. The apparatus of claim 10, wherein the displacement processor is further configured to:
activate at least a first displacement cell of the set of displacement cells responsive to activating of the first set of location cells followed by activating of the second set of location cells;
send an intra-module signal from the first displacement cell to a second displacement cell of the set of displacement cells; and
activate the second displacement cell responsive to receiving of the intra-module signal, activation of the second displacement cell generating a cell activation signal indicating an activated state of the second displacement cell for identifying the one or more objects from the first and second candidate objects.

18. The apparatus of claim 10, further comprising:
activate a first displacement cell of the set of displacement cells responsive to activating of the first set of location cells followed by activating of the second set of location cells;
send an intra-module signal to a displacement cell excluded from the set of displacement cells; and
deactivate the displacement cell excluded from the set of displacement cells responsive to receiving of the intra-module signal, deactivation of the excluded displacement cell generating a cell activation signal indicating a deactivated state of the excluded displacement cell for identifying the one or more objects from the first and second candidate objects.

19. A non-transitory computer readable storage medium storing instructions thereon, the instructions when executed by a processor cause the processor to:

receive first feature-location information identifying a first feature and a first location of the first feature;

activate a first set of location cells in a location processor to indicate first candidate objects having the first feature at the first location, responsive to receiving the feature-location information;

receive second feature-location information identifying a second feature and a second location of the second feature;

activate a second set of location cells in the location processor to indicate second candidate objects having the second feature at the second location, subsequent to activating of the first set of location cells, activate a set of displacement cells in a displacement processor to represent displacement of the first set of locations cells and the second set of locations cells, responsive to receiving activation states of the first location cells followed by activation states of the second location cells from the location processor; and identify one or more objects from the first and second candidate objects according to the set of activated displacement cells.

20. The non-transitory computer readable storage medium of claim 19, wherein the first set of location cells represents a periodic point in a coordinate space centered around the first candidate objects and the second set of location cells represents a distinct periodic point in a coordinate space centered around the second candidate objects.

* * * * *